United States Patent
Giordano (10) Patent No.: US 6,820,643 B2
(45) Date of Patent: Nov. 23, 2004

(54) LIQUID PRESSURE REGULATOR WITH BUILT-IN ANTIDRAINAGE VALVE

(76) Inventor: Daniel Héctor Giordano, Lavalle 307-Tigre, Buenos Aires (AR), 1648

( * ) Notice: Subject to any disclaimer, the term of this patent is extended or adjusted under 35 U.S.C. 154(b) by 62 days.

(21) Appl. No.: 10/335,438

(22) Filed: Dec. 30, 2002

(65) Prior Publication Data

US 2003/0121548 A1 Jul. 3, 2003

(30) Foreign Application Priority Data

Jan. 2, 2002 (AR) .................................... P020100002
Aug. 20, 2002 (AR) .................................... P020103118

(51) Int. Cl.[7] .............................................. G05D 16/02
(52) U.S. Cl. ........................................ 137/505; 137/508
(58) Field of Search ........................... 137/505, 505.18, 137/508

(56) References Cited

U.S. PATENT DOCUMENTS

| | | | |
|---|---|---|---|
| 2,498,194 A | * | 2/1950 | Arthur ........................ 137/505 |
| 2,888,033 A | | 5/1959 | Eickmeyer |
| 3,338,259 A | * | 8/1967 | Tribe ...................... 137/505.18 |
| 4,474,207 A | | 10/1984 | Rosenberg |
| 4,543,985 A | | 10/1985 | Healy et al. |
| 5,257,646 A | | 11/1993 | Meyer |
| 5,875,815 A | | 3/1999 | Ungerecht et al. |

OTHER PUBLICATIONS

U.S. patent application Publication US 2002/0029806 A1, Giordano, Daniel Hector.

Argentinean Patent Application PUblication No. P 99 01 00737, Giordano, Daniel Hector.

* cited by examiner

Primary Examiner—Stephen M. Hepperle
(74) Attorney, Agent, or Firm—Emrich & Dithmar LLC (57) ABSTRACT

A pressure regulator assembly includes an inlet portion having a passageway through which liquid passes through the assembly. The assembly includes a plunger movable within the housing to selectively engage the inlet portion or the housing to control the path of liquid through the assembly.

14 Claims, 5 Drawing Sheets

GRAPH 1

FIG 10

LIQUID PRESSURE REGULATOR WITH BUILT-IN ANTIDRAINAGE VALVE

SUMMARY OF THE INVENTION

The present invention relates to a regulator of liquid pressure of the type used in liquid conducting systems, for example, irrigation systems with the pressure regulator maintaining a constant pressure of the liquid flowing out through it, independent from the inflowing pressure. The pressure regulator device in accordance with the present invention, apart from keeping the outlet pressure constant by-means of an adjustment of one of its components, the device works also as an antidrainage valve.

The liquid pressure regulator has five components: three main parts and two accessories. The main parts include a first part through which the liquid flows into the regulator; an intermediate part, a plunger which slides on a piston fixed on the first part, and a third part through which the liquid flows out of the regulator. The accessories include one seal and one spring.

It is important to note that the double frustoconical profile in the plunger and toroidal in the contact point of the plunger in the inlet piece and a bolt in which the plunger ends, which slides into the cylindrical cavity of the housing, giving a second support to get a coaxial sliding of the plunger on the fixed piston of the inlet part. Apart from these components, there is an alternative related to the plunger, on which a double rear bolt is foreseen: one of them is the one mentioned before, but concentric, and before this one, another bigger one is built, which leans on the internal wall of the housing and avoids liquid leakage until the desired pressure is obtained. With this, the regulator does double work: the pressure regulating valve and antidrainage valve simultaneously function, as was mentioned before.

BACKGROUND OF THE INVENTION

The pressure regulator most frequently used today differ substantially from the present invention, such prior art regulators are described in U.S. Pat. Nos. 4,543,985, 5,257,646 and 5,875,815. The technical differences between the prior art regulators and the present invention are, among other things, provided by the location where the regulation of the pressure is produced. In the prior art regulators, the liquid enters the regulator through the center and is directed to the periphery by means of a deflector star which immediately diverts to the center where the regulation takes place. During the first step, the central flow moves to the periphery, and in the second step, this same flow moves from the periphery back to the center where the regulation takes place. However, the prior art regulators are significantly more complex than the present invention because they have, on average, a total of least 18 components.

In the present invention, regulation takes place during the first step when the liquid flow moves from the center to the periphery of the regulator. The liquid flow moves back to the center only when leaving or exiting the device. This fluid flow path permits the present invention to be significantly less complicated and less costly than the prior art regulators while being highly effective and efficient.

In U.S. Pat. No. 5,875,815, a pressure regulating valve is provided with a built-in antidrainage device, but, as it will be explained later, such a valve differs substantially from the present invention, including everything related to the antidrainage device. Apart from what was previously mentioned related to the central flow of this regulator, in U.S. Pat. No. 5,875,815, the antidrainage device presents the following characteristics: the plunger, or cylindrical central part, must be built in three parts; the element working as the antidrainage device is positioned permanently in the center of the flow of the fluid, which means that even after the regulator permits the fluid into the device, the antidrainage elements continue to oppose the fluid flow, thereby producing high pressure losses. In the regulator in accordance with the present invention, on the contrary, the drainage system provides that: the plunger is always built in only one piece; and the more the plunger slides within the regulator assembly, the less the plunger opposes the fluid flow, unexpectedly decreasing the pressure losses within the device.

Prior art regulators are additionally disclosed in U.S. Pat. Nos. 4,474,207 and 2,888,033. The regulators in accordance with these patents are not frequently used today because they provide inaccurate pressure regulation due to the non-coaxial sliding of the intermediate cylindrical piece with respect to the inlet piece and due to the point of contact between the plunger and the inlet piece being flat on both pieces.

One important factor affecting inaccuracy of pressure regulation is that because there is a single supporting point between the plunger and the fixed piston, the axis of the plunger is unstable and, therefore, it does not move in a coaxial manner with respect to the fixed piston of the inlet piece. This produces lateral movements or inclination. Thus, the non-coaxial movement of the cylindrical piece produces a lack of accuracy of the regulator and a high level of hysteresis.

With respect to the lack of accuracy of this type of regulator, when the axis of the plunger does not have a coaxial and aligned position with respect to the axis of the piston, the closing of the plunger over the inlet piece is not consistent around the entire perimeter and, therefore, there are pressure leaks from the inlet to the outlet resulting in the regulator being inaccurate. Further, these differences are not constant, so for the same inlet pressure, there are different outlet pressures and, therefore, inaccuracy results from this type of regulator.

Figure 10:
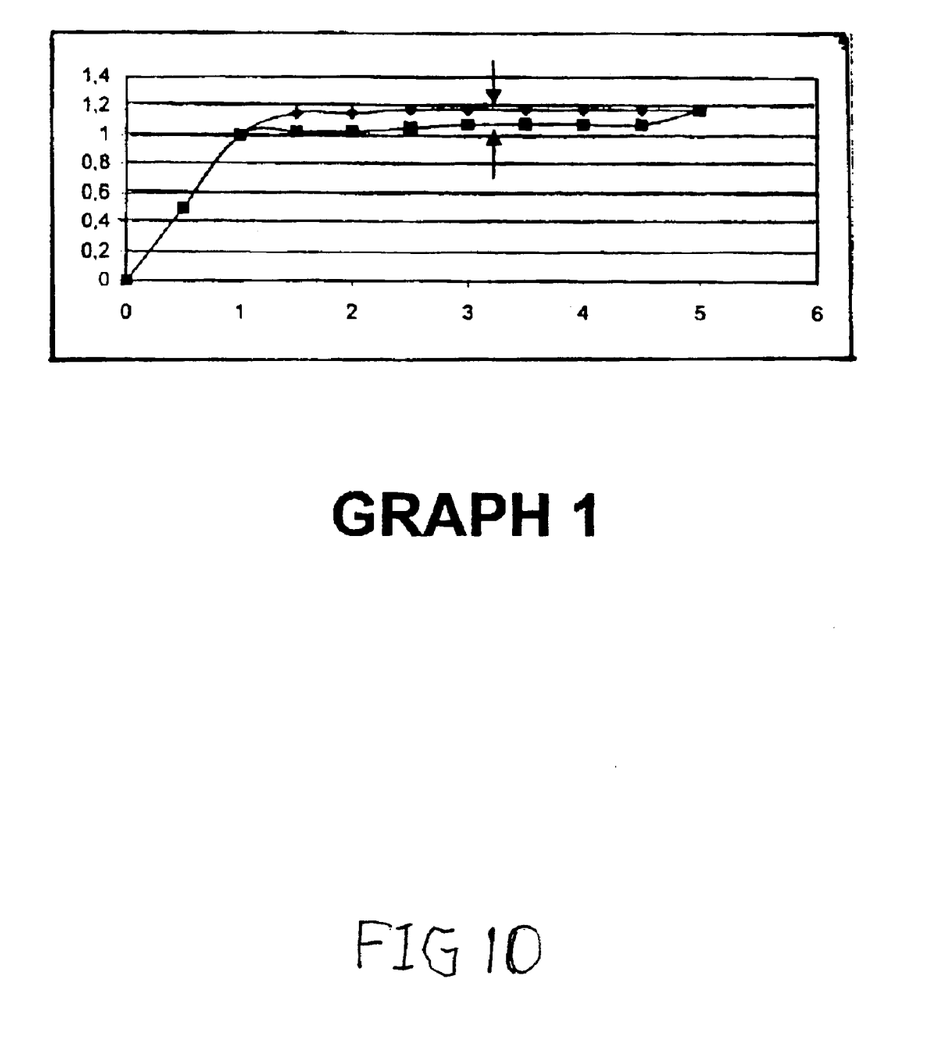
FIG. 10 is a curve of a typical regulator where it is possible to observe the hysteresis effect.

With respect to hysteresis, hysteresis may be observed when the performance of the regulator is represented on a graph in which the x-axis is the inlet pressure of the regulator and the y-axis the outlet pressure of the regulator. Two curves are obtained as the inlet pressure is varied. One curve results from the increase of the inlet pressure while the other curve is obtained as this pressure decreases. The difference between these two curves is called hysteresis, as shown in Graph No. 1. The upper curve was obtained by increasing the pressure in the inlet of the regulator, while the lower curve was obtained while decreasing the pressure in the inlet of the regulator. All pressure regulators have hysteresis, but the lower the hysteresis, the more efficient the regulator will be.

However, when the movement between the plunger and the piston is not coaxial, it is difficult for the plunger to return to its original position, thus increasing the hysteresis of the regulator. To overcome these problems, U.S. Pat. No. 2,888,033 suggests a screw structure which fixes the position of the plunger thereby causing an inclination of this piece from its initial position. Also, U.S. Pat. No. 4,474,207 discloses the use of additional ribs on the housing. These ribs provide very little space (almost none) over the plunger to be effective, a structure which increases the level of hysteresis. However, if a larger space is left to decrease the level of hysteresis, lateral movements cannot be avoided.

Also, the surfaces of contact between the plunger and the inlet piece of the present invention are flat. U.S. Pat. Nos. 4,474,207 and 2,888,033 share this structural characteristic. However, the problem of accuracy occurs when flow is low because there needs to be a small and accurate closing. In this operating condition, it is found that the change of pressure from the inlet to the outlet pressure does not occur in a single point. This change in pressure occurs throughout the thickness of the plunger. This means that there is an inlet pressure on one side of the plunger and an outlet pressure on the other side of the plunger. Consequently, if the closing is flat, the decrease of the pressure from the inlet to the outlet is progressive throughout the length or thickness of that plane. This means that there is an intermediate pressure between the inlet pressure and the outlet pressure and, therefore, this intermediate pressure is directly proportional to the inlet pressure because the higher the inlet pressure is, the higher the intermediate pressure will be.

It is important to consider that the surface of the plunger which produces the opposing force of the spring is its exterior surface, without considering the surface of the thickness, because this surface receives pressure from both sides. Because the surface of the thickness is below the intermediate pressure, which varies and is affected directly by the inlet pressure, the opposing force of the regulation spring decreases with the increase of the inlet pressure. Thus, theoretically, the outlet pressure on the other side of the plunger is constant. In this manner, the regulation is ineffective and increases the level of hysteresis. With high flow, where the closing should not be narrow, this effect is not very important, even though it does exist. However, its presence with low flow is significant.

The pressure regulator of U.S. Pat. No. 4,474,207 also has five pieces and two accessories and has problems and structures that have been solved by the present invention. The inventor of this application has also filed previous pending patent applications including Argentinean Nos. P990100737, P000104751 and P010101164; and in the U.S.A., U.S. Ser. No. 09/950,482. In these pending patent applications, which present similar regulators to the present invention, one may achieve successful regulation with a double frustoconical profile in the contact point between the plunger and the inlet part, and one may also be able to maintain and slide coaxially the plunger in relation to the fixed piston. This is accomplished with the help of at least two positioning elements, which, as previously described, permit the plunger to slide and to be kept coaxially in relation to the fixed piston. Also mentioned were various specific types of positioning elements.

In the present application, different elements in these applications are presented: a new type of closure or of contact point between the plunger and the inlet piece; a new form of positioning the plunger coaxially in relation to the fixed piston of the inlet piece; and a simple change in the plunger with which we make the disclosed regulator work simultaneously as a regulator and as an antidrainage valve.

The new type of closure consists in making a toroidal profile in the inlet piece where it contacts the plunger, instead of the frustoconical profile of the previous presentations, and a double frustoconical profile in the sleeve of the plunger. Regarding the new method of positioning the plunger coaxially in relation to the fixed piston, this method consists of a bolt that continues the plunger and slides into the cylindrical cavity made with that objective in the housing.

Concerning the antidrainage system, the making of a double bolt in the rear portion of the plunger, the first prevents water drainage when touching the internal wall of the housing until minimal pressure has been reached.

It is important to clarify here that in relation to borders that the U.S. Pat. No. 4,474,207 presents one difference with the bolt of the present invention is that it is separated from the seal that serves as the first support to the plunger, at a distance seven times larger than the distance between the seal and the contact or closure point. This enables us to give it a large span so that it does not hinder the sliding of the bolt inside the cavity.

Undoubtedly, due to the larger span, the bolt will incline, but the maximum inclination of the bolt would only affect the plunger in a seventh part in the contact point. While the borders of the U.S. Pat. No. 4,474,207 are throughout the entire surface, having a direct incidence, that is 1 to 1, in that way it is impossible to enlarge the span. This will also be enlarged in the Detailed Description of the Invention.

SUMMARY OF THE INVENTION

The present invention is a pressure regulating device for liquids consisting of three principal parts. The first part is an inlet through which the liquid enters and travels to the periphery of the device through internal tubes. The first part ends in a piston, which is fixed to the same and on which a cylindrical piece slides; the second part, the plunger, closed on one end, where the bolt ends, this bolt slides within the cylindrical cavity located in the housing.

Part 2, the plunger, slides on the fixed piston of part 1, and by means of its sleeves, opens or closes the internal pipes of part 1 mentioned before, causing in this way the regulation of the outlet pressure of liquid.

Enclosing the group is part 3, the housing, which also forms, between itself and part 2 (plunger), a pipe through which liquid is led outside of the regulator. The outlet is found on the third housing part. This outlet part has, consequently, pipes that let the liquid go out of the device, a cylindrical cavity through which the rear bolt of the plunger slides, and also with the front bolt of the plunger it produces the antidrainage effect.

The regulator has these other accessories:

A spring 55, which is positioned between inlet part 1 and the cylindrical part 2. The spring is designed to maintain both parts separated and opposes to the power generated by the outlet pressure and the internal surface of the plunger 2; and A seal that closes hermetically the chamber formed between the fixed piston of part 1 and the plunger 2.

As discussed previously, a third accessory, the positioning element, may be used. However, its use in this invention is not essential because the bolt fits the function of placing the plunger in a coaxial way in relation to the fixed piston perfectly, but if it is used it increases the effectiveness of the regulator.

DETAILED DESCRIPTION OF THE INVENTION

Figure 1:
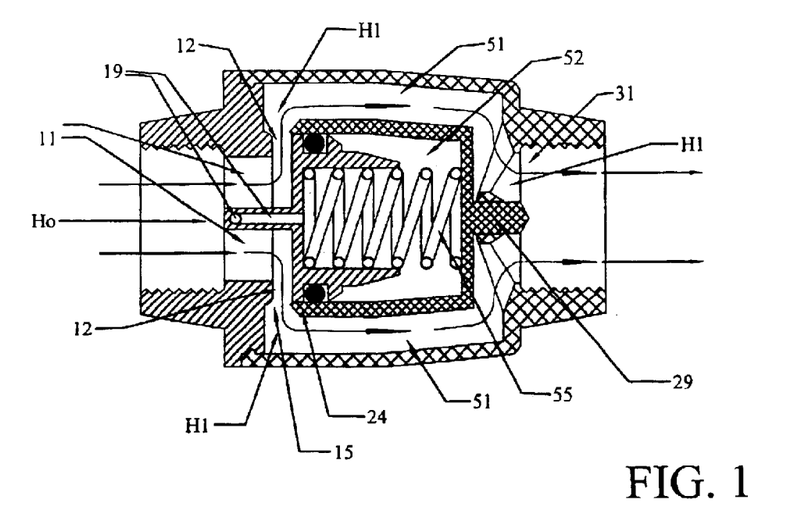
FIG. 1 is a cross-sectional view of the pressure regulator assembly in accordance with the present invention.
Figure 2:
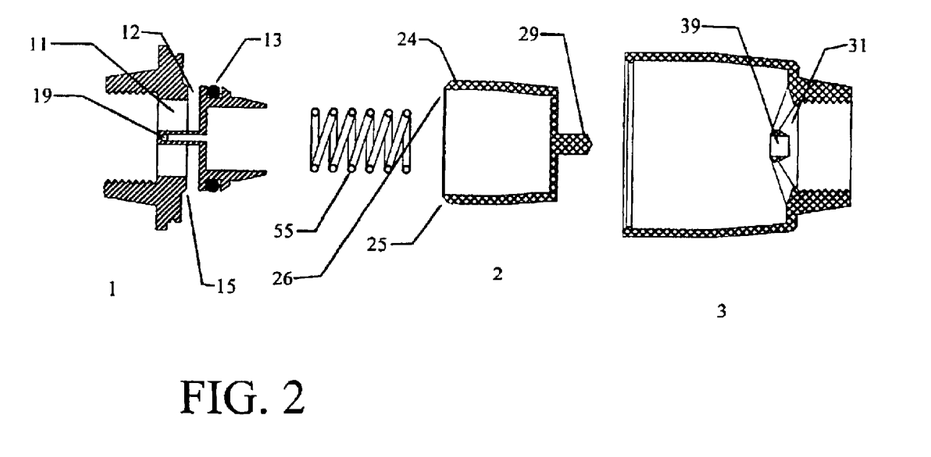
FIG. 2 is an exploded view of a pressure regulator assembly in accordance with the FIG. 1.

In FIG. 1, the functioning of the regulator assembly is described, while in FIG. 2 it is possible to see the regulator components of the regulator assembly. As the arrow lines shown in FIG. 1, the liquid goes in the device through inlet piece 1 (FIG. 2) through pipes 11 and then through pipes 12 to the periphery of the regulator, through which it continues through pipes 51, formed between cylindrical part 2, the plunger and part 3, the housing, through the exit pipe 31 of the housing.

The inlet piece 1 ends in a fixed piston, on which the plunger 2 slides. Plunger 2, by means of its sleeve 24, can block tubes 12 of the inlet part. Positioned between the inlet piece 1 and the plunger 2, there is a spring member 55 whose power maintains the plunger 2 at a distance from inlet piece 1. When parts 1 and 2 are at their maximum separation point, tubes 12 of inlet part 1 are at their maximum opening point. The pressure of the fluid exiting the regulator assembly generates with the internal surface of the plunger 2 (surface of regulation), a force (outlet force) opposed to the power of the spring 55. The internal surface must be considered because the surface of the thickness of the plunger receives pressure from both sides thereof. While a pressure inferior to the nominal of regulation enters the regulator, the power of spring 55 prevails over the outlet force, thereby maintaining plunger 2 away from inlet part 1, and consequently tubes 12 are kept at their maximum opening point, transmitting all the pressure out of the assembly.

Figure 8:
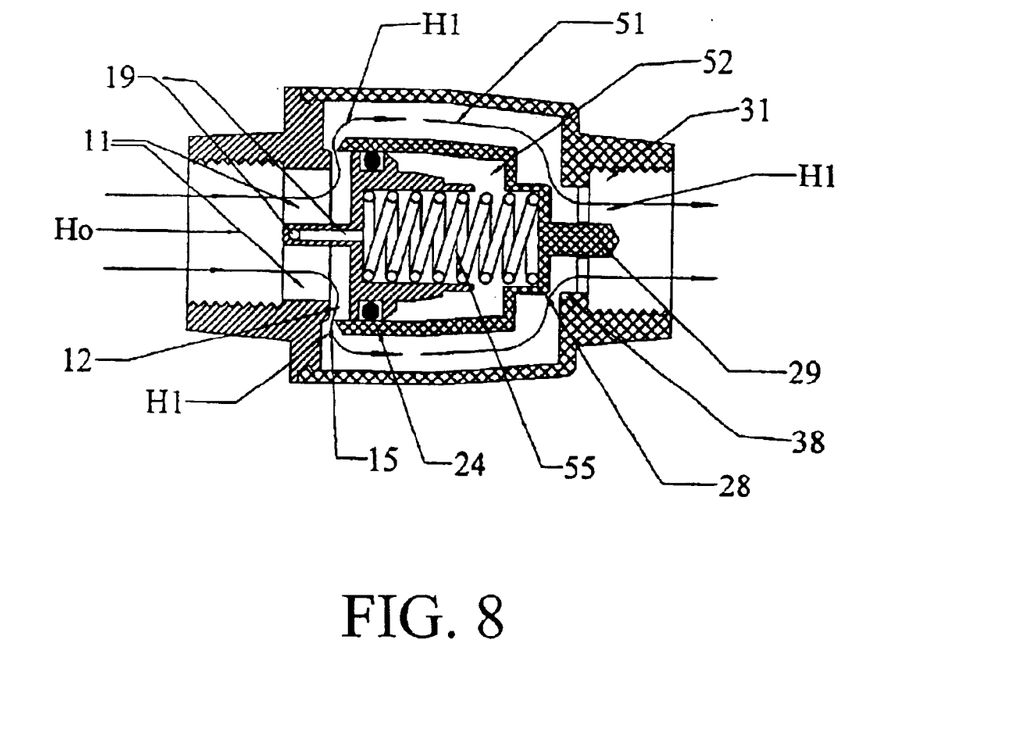
FIG. 8 is a cross-sectional view of the pressure regulator assembly with built-in antidrainage system where the antidrainage system is open in accordance with the present invention.

When the inlet pressure of the regulator is increased, the outlet pressure increases immediately. When this increased pressure is such that the outlet pressure is greater than the regulation nominal pressure, the outlet force will be higher than the power of the spring 55. Thus, the outlet force overcomes the force of spring 55 and moves the plunger 2 over the inlet portion 1. In this manner, plunger portion 2 totally or partially closes tubes 12 of inlet portion 1 with its sleeve 24, as shown in FIG. 8. When closing tubes 12, the outlet pressure decreases until it makes the regulating pressure which is when the outlet force and the spring forces are equivalent. A similar situation occurs when the volume of the flow decreases downstream of the regulator assembly, for example, when a valve is closed. The pressure of the liquid in this situation would increase and, therefore, the outlet pressure of the regulator assembly would also increase, repeating the effect previously described.

If the inlet pressure is decreased, or the volume of flow is increased downstream of the regulator, the outlet pressure would decrease and the force of the spring 55 would prevail on the outlet force, thereby opening tubes 12 and restoring equilibrium to the system. The chamber 52 (FIG. 1), formed between the plunger portion 2 and the fixed piston, must be empty of liquids for the plunger 2 to slide correctly over the fixed piston of part 1. For this reason, a seal 13 (FIG. 2) has been set on the fixed piston. This seal may be any one of the seals usually located between a piston and a sleeve, for example, an o-ring, x-ring, quad-ring, polypack, or the like.

Figure 6:
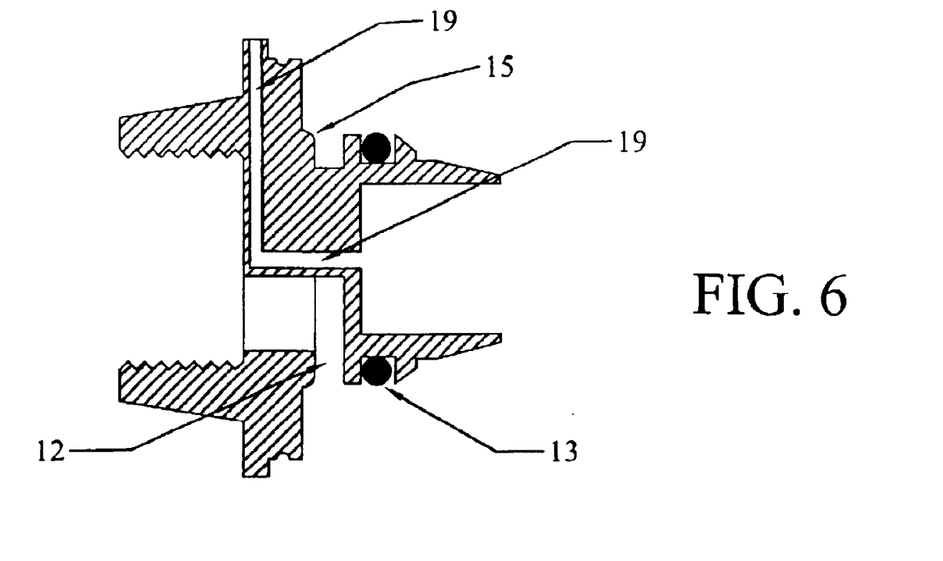
FIG. 6 is an enlarged sectional view showing a tube ventilating the chamber between the inlet portion and the plunger portion in accordance with the present invention.

To avoid counter-pressures due to the air that is trapped in chamber 52, since these counter-pressures might also affect the correct sliding of plunger 2, it is important to eliminate these pressures. For this purpose, a ventilation tube 19 has been supplied. Furthermore, to obtain precision working of the regulator assembly, it is fundamental that the plunger 2 is positioned and slides coaxially in relation to the fixed piston of inlet part 1. The positioning elements and seal 13 provide the plunger 2 with two support points on part 1. As a result of these two support points, plunger 2 places itself coaxially in relation to fixed piston of the inlet part 1 and will slide and will always be maintained coaxially in relation to said part 1.

In the present application, a novel method of obtaining coaxial sliding is achieved by a rear bolt 29 of the plunger, which slides within the cylindrical cavity 39 of the housing. For the bolt 29 to slide correctly without producing hysteresis, it is important to provide it with a appropriate dimensions. For example, if a there is a bolt of 6 mm, the cylindrical cavity 39 should be given an internal diameter of 6.25 mm. This means that the bolt 29 could incline that span of 0.25 mm, but since the distance from the bolt to the seal is 6 to 7 times higher than the distance from the seal to the contact point between the plunger and the inlet piece 1, this inclination of 0.25 mm would affect in the contact point only 0.036 to 0.031 mm, an incidence which is negligible.

In previous applications by the same inventor, the use of a second positioning element and several types of positioning elements, among them the one that better fulfils the positioning function is the o-ring (in spite of the disadvantage that it causes friction) were mentioned. Given that the o-ring has a manufacturing tolerance over those values it is assumed that the same o-ring does not avoid such inclination. Thus, the functionality of the o-ring is provided but the advantage of the bolt is that it does not produce friction. In this manner, the plunger is positioned coaxially in relation to the fixed piston of the inlet piece 1. Thus, the bolt 29 together with the cylindrical cavity 39 fulfils the functions of the second support point of the plunger.

Figure 9:
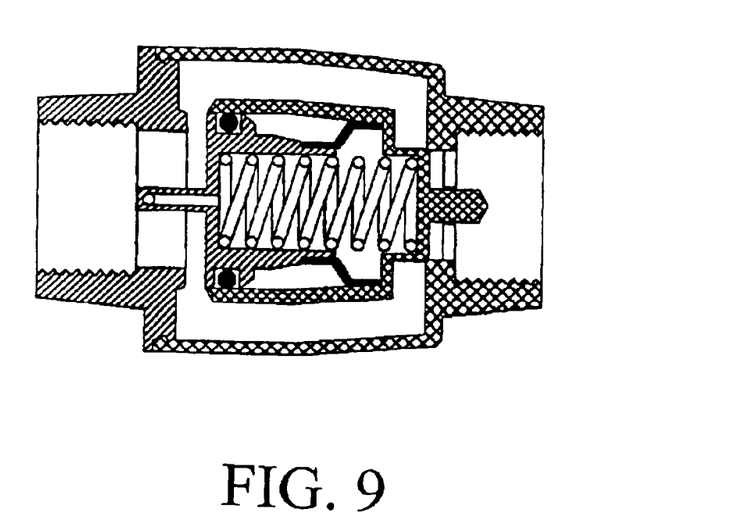
FIG. 9 is a cross-sectional view of the pressure regulator assembly showing the present integrated bolt system with one of the positioning elements of the previous filed applications.

The positioning element of the previous applications can still be used inside a regulator with the rear bolt. From this results a much more efficient regulator because three support points would supply higher security to the coaxial sliding of the plunger. This distribution can be seen in FIG. 9, where a regulator is integrated with both elements. The plunger has three elements that position it, the seal, the positioning element of the previous presentation and the bolt. These three elements guarantee an absolute coaxial slide. However, the positioning element of the previous presentation or the bolt 29 of this one could be used individually to provide a coaxial slide.

The problems presented by a flat closing system in accordance with prior art regulators (FIG. 5) will be explained below, even though it is not the closing system used in the present application. When the sides of a plunger and of an inlet portion are flat, as referenced in the background of the invention, there is an area where the pressure changes from a first point, the internal side of the plunger, where there is inlet pressure (Ho), to a second point on the external side of the sleeve of the plunger, where there is outlet pressure (H1). In such a case, the pressure will decrease progressively along the thickness of the plunger. This means that there will be an intermediate pressure (Ho1) between the inlet and outlet pressure. This intermediate pressure (Ho 1) is directly proportional to the inlet pressure. Assuming simply that the intermediate pressure (Ho1) in the surface of the thickness of the sleeve 24 is the average pressure of the inlet (Ho) and the outlet pressure (H1), it is concluded that the outlet force opposed to the spring is not constant and varies directly with the incoming pressure. This is due to the fact that the surface corresponding to the thickness of the plunger 2 would not receive the same pressure on both sides, the one corresponding to the closing point would have that intermediate pressure (Ho1), while the rear face would have outlet pressure (H1), in theory regulated. Consequently, the pressure on the closing side would be higher than the outlet pressure. This difference between the intermediate and the outlet pressure increases directly with the inlet pressure. In this manner, the outlet force opposed to the spring decreases while the inlet pressure of the regulator increases.

Figure 5:
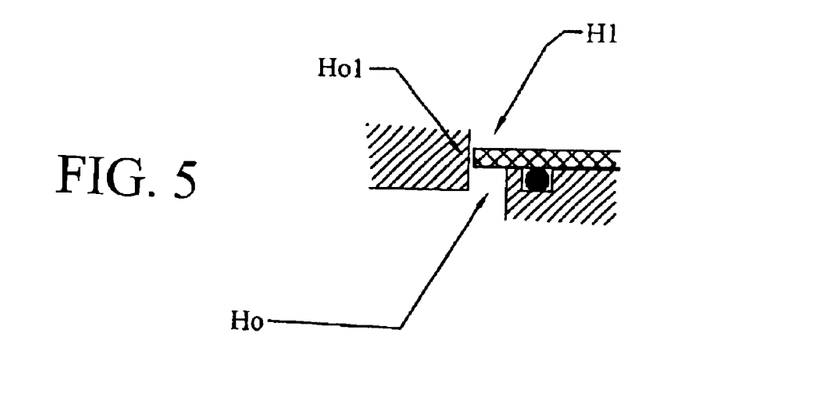
FIG. 5 is an enlarged partial sectional view illustrating the flat closing of the flow of a passageway.

While the outlet force decreases, more pressure is needed to match the spring force and, consequently the outlet pressure also increases with the increases of the inlet pressure. Expressing it in an equation:

Spring power=External Surface*Outlet Pressure−Thickness Surface*Intermediate Pressure.

If intermediate pressure is increased, the only variable that can balance this equation is the outlet pressure. In conclusion the outlet pressure (H1) is also directly proportional to the inlet pressure (Ho). Thus, there cannot be a constant outlet pressure and, therefore, inaccuracy results in the prior art regulators.

Figure 3:
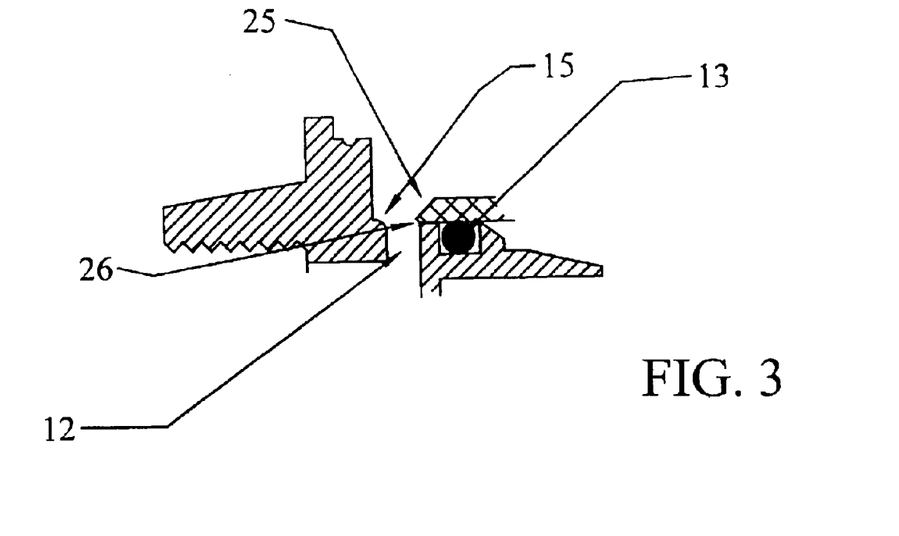
FIG. 3 is an enlarged partial sectional view illustrating the toroidal/conical contact point between the inlet piece and the plunger in the opened position in accordance with the present invention.

In previous designs, a double cone closing between the inlet piece 1 and the plunger 2 was disclosed, and this closure may be effective. In this presentation, another way of making that closure is shown, which is as effective as the double cone, with the advantage that at the moment of decreasing the pressure it frees the plunger more easily, decreasing the hysteresis level. As shown in FIG. 3, this closure has a toroidal profile 15 in the inlet piece 1, in the point where it contacts the plunger, which has a double cone in its sleeve 24 (Refs. 25 and 26). The first cone 26 is in the sector of the plunger that leans against the toroidal profile of the inlet piece, and there is a second cone 25, inverted in relation to the previous one. The first cone 26, of very reduced size, is simply the point where the plunger 2 sits in the toroidal profile 15 of the inlet piece, is built tangentially to the toroid, provides an excellent closure and does not harm the toroid. The second cone 25, frees the fluid and obtains outlet pressure in all the thickness of the plunger, avoiding the effects of flat closure mentioned previously.

Figure 4:
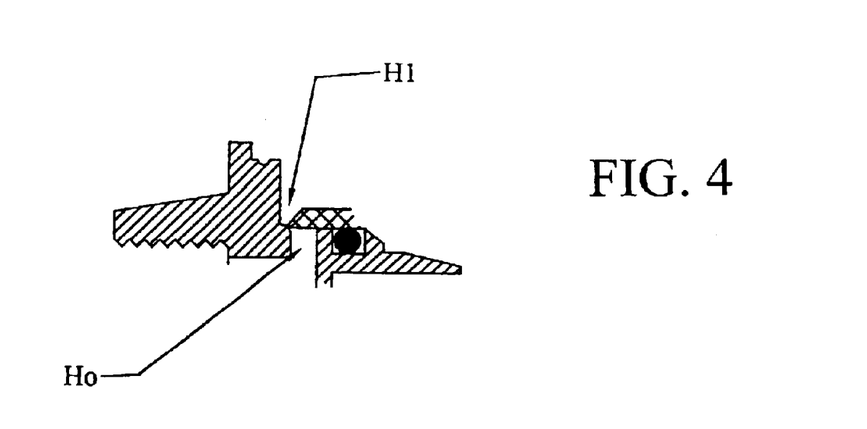
FIG. 4 is an enlarged partial sectional view illustrating the toroidal/conical contact point between the inlet piece and the plunger in the closed position in accordance with the present invention. It can be seen here how the outlet pressure is in all the thickness of the plunger.

In FIGS. 3 and 4, the closure between the inlet piece 1 and the plunger 2 is shown. In these FIGS., the cylindrical part 2, plunger, makes an effective closure on the toroid 15 of the inlet piece 1. Also, due to the frustoconical profile 25 of the sleeve 24 of plunger 2, an outlet pressure (H1) is obtained in all the thickness of the cylindrical part 2, both in its rear face and cone 25 there is the same outlet pressure H1. The same is true of FIG. 4 as the pressure is divided from the closure point, then the inlet pressure (Ho) on tubes 12 and outlet pressure (H1) in all the remaining length of the regulator.

Therefore, on the surface corresponding to the thickness of the plunger, the same pressure, outlet pressure (H1), on both sides of the plunger, therefore, and since the outlet pressure is regulated, the outlet force opposed to the spring will be constant. Consequently, a uniform outlet pressure is obtained. There will be precision. In the same previous equation:

Spring power=External Sur.*Outlet Pressure−Thickness Sur.*Outlet Pressure

As it can be appreciated, a uniform outlet pressure is maintained.

Now, it is habitual practice in irrigation systems to install antidrainage valves apart from pressure regulating valves. This practice becomes more necessary if the land presents altitudinal variations. In fields with slopes it is necessary to install both valves, since the pressure regulator valve guarantees uniformity of pressure to all sprinklers, matching the amount of water issued by them, while the antidrainage valve avoids the water to drain from the higher to the lower lands.

With a simple change in part 2, the plunger, the present invention provides a structure which is able to integrate both valves into one without increasing its cost. That is to say, in changing the form of the plunger, without increasing its cost, the pressure regulator structure is able to act also as an antidrainage valve. This is another advantage of the valve presented by the present invention.

Figure 7:
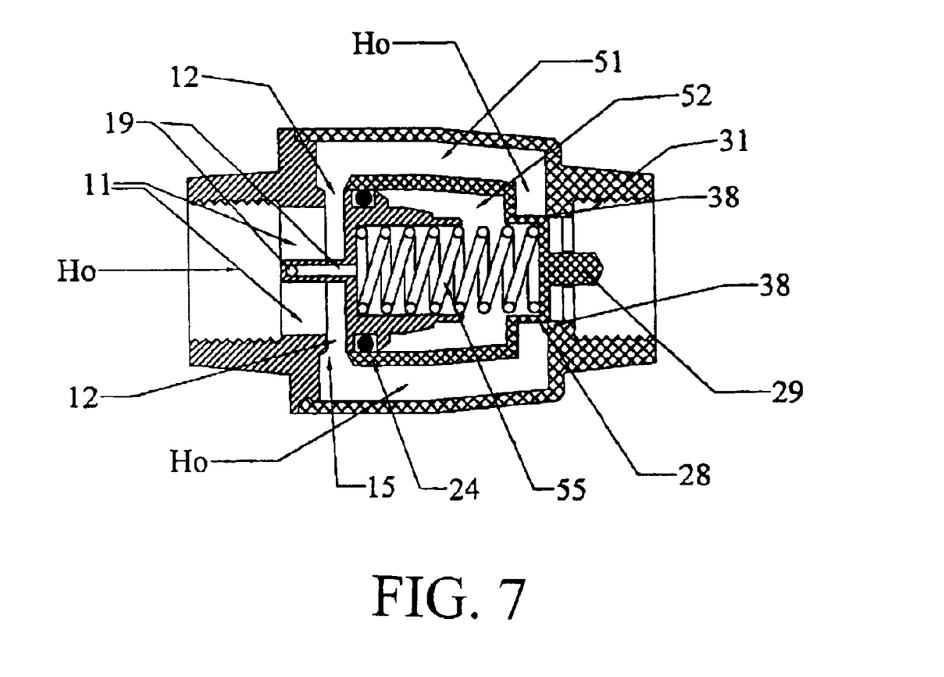
FIG. 7 is a cross-sectional view of the pressure regulator assembly with built in antidrainage system where the plunger is in antidrainage position, thereby stopping the outflow of the fluid, in accordance with the present invention.

In FIGS. 7 and 8, the functioning of the antidrainage system of this regulator is shown and is numbered in both figures, and the different component parts of the device can be readily seen. FIG. 7 corresponds to regulator in antidrainage position, thereby stopping the flow of fluid. As it is possible to see in said FIG. 7, the fluid goes into the regulator through the inlet piece 1, going through pipes 11 and 12 into chamber 51 (formed between the housing and the plunger 2). As previously described, spring 55 pushes part 2, the plunger, against the housing while maintaining tubes 12 in their maximum opening point. In the same way, in this relaxed position the plunger rests its bolt 28 on the face 38 of the housing, a position wherein the fluid cannot exit the device. The fluid maintains the inlet pressure Ho in all the length of the regulator up to the contact point of the bolt 28 and the face 38 of the carcass. From there on the pressure is zero.

The external surface of the plunger 2 minus the surface given by the thickness of the sleeve 24 of the same and minus the surface of the bolt 28, generates together with the inlet pressure, a force that opposes the power of the spring 55. While there is an insufficient inlet pressure, the force of the spring will prevail and the plunger will remain in that position, stopping the flow of the liquid. Once a certain inlet pressure is achieved, the force generated by the pressure and the surface overcomes the power of the spring 55. Consequently, the plunger is moved and allows the flow of the fluid towards the exit, through the tubes 31. Once the fluid passes through these tubes, the distribution of the pressures within the regulator changes in the following manner. In the inlet part there is an inlet pressure Ho in all the length, and after leaving tubes 12, there is outlet pressure H1 in the remaining length of the regulator, as it can be seen in FIG. 8, acting as a pressure regulating valve. When the water supply is suspended, the inlet pressure decreases. While the inlet pressure is higher than the nominal regulation pressure, the outlet pressure will remain regulated, and once the inlet pressure is lower than the nominal regulation pressure, the outlet pressure will be basically equal to the inlet pressure, and the power of the spring will prevail again over the power given by the outlet pressure and the surface of the plunger, thereby forcing this until the bolt 28 of the plunger leans against the face 38 of the housing, blocking once again the flow of fluid, avoiding again the drainage of the pipes (antidrainage).

It is necessary to understand that the necessary pressure for the opening of the antidrainage valve will be higher than the pressure necessary for the closure. This is due to the fact that the surfaces over which the pressures act are different, while the valve is in the antidrainage position, the acting surface is the external surface of the plunger discounting the thickness of the sleeve and discounting also the surface of the bolt 28 because only outlet pressure acts on it, and at this moment said pressure is zero. But once the valve is open, the surface is the external one discounting only the surface of the thickness of the sleeve, considering also to have a pressure on the surface of bolt 28. Thus, because the surface is larger at the closing time, the pressure must be lower. This causes the pressure at which the antidrainage valve opens to be higher than the pressure at which it closes. However, this does not affect the work of the valve.

As we can see from this description, a highly effective regulator assembly is much simpler and has fewer parts, is of reduced size, and is consequently much more economical than the regulators used at present. Also, the regulator assembly includes an antidrainage valve.

What is claimed is:

1. A liquid pressure regulator antidrainage assembly, including in combination:

an inlet portion including passageway means through which a liquid enters the regulator assembly and which is structurally arranged to connect to a source of liquid with said inlet portion including a piston member extending therefrom;

an axial movable plunger portion having a cylinder portion structurally arranged to be located over said piston member of said inlet portion with said inlet portion having a toroidal profile where the plunger rests, with said cylinder portion of said plunger portion having a closed end with two concentric bolts, the first one arranged to sealingly engage in the housing, and the second one slides in a cavity located in the housing, and on the other side an open end defined by a cylindrical sleeve having an annular end structurally arranged to engage said inlet portion to block said passageway, with said annular end having a double conically shaped profile;

a housing portion surrounding said plunger portion and structurally arranged to sealingly engage said inlet portion, said housing portion being structurally arranged to connect to a discharge device, with said housing portion having a cylindrical cavity where the second bolt of the plunger slides in said cavity;

a spring member located between said inlet portion and said plunger portion;

a sealing means located between said piston member of said inlet portion and said plunger portion; and communication tube members between the rear cavity of said inlet portion and the atmosphere.

2. The liquid pressure regulator in accordance with claim 1, wherein:

the contact point between said inlet portion and said plunger is formed by a toroidal profile in one and a conical profile in the other, with said plunger portion having a closed end with two concentric bolts, the first one arranged to sealingly engage in said housing, and the second one slides in a cavity located in said housing, and wherein said housing portion includes a cylindrical cavity within which said bolt of said plunger slides.

3. The liquid pressure regulator in accordance with claim 1, wherein the contact point between said inlet portion and said plunger portion is formed by a toroidal profile in one and a conical profile in the other.

4. The liquid pressure regulator in accordance with claim 1, wherein: a plunger having a closed end with two concentric bolts, the first one arranged to sealingly engage in said housing, and the second one slides in a cavity located in said housing; and a housing having a cylindrical cavity within which said bolt of said plunger slides.

5. The liquid pressure regulator in accordance with claim 1, wherein said plunger and the rear cavity of said piston of said inlet portion form a chamber connected with the atmosphere through the internal pipes in the inlet portion.

6. The liquid pressure regulator in accordance with claim 1, wherein said sliding plunger has a cylindrical form with one of its ends open, the border of this end having a frustoconical profile, and the other end closed having two concentric bolts, the first one arranged to sealingly engage in said housing, and the second one slides in a cavity located in said housing.

7. The liquid pressure regulator in accordance with claim 1, wherein a housing portion surrounding said plunger portion having this housing a cylindrical cavity where the second bolt of the plunger slides serving it like a guide.

8. The liquid pressure regulator and antidrainage assembly, including in combination:

an inlet portion including passageway means through which a liquid enters the regulator assembly and which is structurally arranged to connect to a source of liquid, with said inlet portion including a piston member extending therefrom;

an axially movable plunger portion having a cylinder portion structurally arranged to be located over said piston member of said inlet portion, with said inlet portion having a toroidal profile where the plunger rests, with said cylinder portion of said plunger portion having a closed end with a bolt member positioned inside a cavity located in the housing, and on the other side an open end defined by a cylindrical sleeve having an annular end structurally arranged to engage said inlet portion to block said passageway, with said annular end having a double conically shaped profile;

a housing portion surrounding said plunger portion and structurally arranged to sealingly engage said inlet portion, said housing portion being structurally arranged to connect to a discharge device, with said housing portion having a cylindrical cavity where. said bolt of the plunger slides in said cavity;

a spring member located between said inlet portion and said plunger portion;

a sealing means located between said piston member of said inlet portion and said plunger portion; and communication tube members between the rear cavity of said inlet portion and the atmosphere.

9. The liquid pressure regulator in accordance with claim 2, wherein:
the contact point between said inlet portion and said plunger portion is formed by a toroidal profile in one and a conical profile in the other;
a plunger having a closed end with a rear sliding bolt inside a cavity located in the housing; and
said housing portion includes a cylindrical cavity within which said bolt of said plunger slides.

10. The liquid pressure regulator in accordance with claim 2, wherein the contact point between said inlet portion and said plunger portion is formed by a toroidal profile in one and a conical profile in the other.

11. The liquid pressure regulator in accordance with claim 2, wherein a plunger having a closed end with a rear sliding bolt inside a cavity located in the housing; and a housing having a cylindrical cavity within which said bolt of said plunger slides.

12. The liquid pressure regulator in accordance with claim 2, wherein said plunger and the rear cavity of said piston of said inlet portion form a chamber connected with the atmosphere through the internal pipes in the inlet portion.

13. The liquid pressure regulator in accordance with claim 2, wherein said sliding plunger has a cylindrical form with one of its ends open, the border of this end having a frustoconical profile, and the other end closed with a sliding bolt inside a cavity located in said housing.

14. The liquid pressure regulator in accordance with claim 2, wherein a housing portion surrounding said plunger portion, this housing having a cylindrical cavity where the second bolt of the plunger slides serving it like a guide.

* * * * *